US012260993B2

(12) United States Patent
Seif et al.

(10) Patent No.: US 12,260,993 B2
(45) Date of Patent: Mar. 25, 2025

(54) DC LINK CAPACITOR, POWER CONVERTER AND ELECTRIC VEHICLE

(71) Applicant: Valeo eAutomotive France SAS, Cergy (FR)

(72) Inventors: Lothar Seif, Cergy (FR); Christophe Lopes, Cergy (FR); Aurelien Pouilly, Cergy (FR); Thomas Canonne, Cergy (FR)

(73) Assignee: Valeo eAutomotive France SAS, Cergy (FR)

( * ) Notice: Subject to any disclaimer, the term of this patent is extended or adjusted under 35 U.S.C. 154(b) by 100 days.

(21) Appl. No.: 17/992,329

(22) Filed: Nov. 22, 2022

(65) Prior Publication Data

US 2023/0162927 A1    May 25, 2023

(30) Foreign Application Priority Data

Nov. 23, 2021  (EP) ..................... 21209949

(51) Int. Cl.
| | |
|---|---|
| *H01G 4/236* | (2006.01) |
| *H01G 2/04* | (2006.01) |
| *H01G 2/10* | (2006.01) |
| *H01G 4/224* | (2006.01) |
| *H01G 4/32* | (2006.01) |
| *H01G 4/38* | (2006.01) |
| *H01G 4/40* | (2006.01) |

(52) U.S. Cl.
CPC ............. *H01G 4/236* (2013.01); *H01G 2/04* (2013.01); *H01G 2/106* (2013.01); *H01G 4/224* (2013.01); *H01G 4/32* (2013.01); *H01G 4/38* (2013.01); *H01G 4/40* (2013.01)

(58) Field of Classification Search
None
See application file for complete search history.

(56) References Cited

U.S. PATENT DOCUMENTS 10,717,366 B1 *  7/2020  Jaksic ................. H02M 7/5387
2004/0230847 A1 * 11/2004  Patwardhan .......... H02M 1/126
                                                          713/300
(Continued)

FOREIGN PATENT DOCUMENTS

JP    2000195748 A  *  7/2000
JP    2005-012940 A     1/2005
(Continued)

OTHER PUBLICATIONS

Translation JP 2000195748A.*
Office Action issued in corresponding Japanese Patent Application No. 2022-186858 mailed Jul. 9, 2024 (8 pages).

*Primary Examiner* — Eric W Thomas
(74) *Attorney, Agent, or Firm* — Osha Bergman Watanabe & Burton LLP

(57) ABSTRACT

A DC link capacitor (8) comprises a capacitor housing, a plurality of capacitor cells (1), each comprising a film capacitor element (2) with a wound metallized film and two contact terminals (3a, 3b) connected to the metallized plastic film. The plurality of capacitor cells (1) are arranged in the capacitor housing (4) and are sealed therein by means of a sealing material (7). The contact terminals (3a, 3b) are electrically isolated from each other and protrude separately out of the sealing material (7), in order to be connected by means of bus bars.

11 Claims, 3 Drawing Sheets

(56) References Cited

U.S. PATENT DOCUMENTS

| | | | | |
|---|---|---|---|---|
| 2010/0155158 A1* | 6/2010 | Azuma | ................... | B60K 6/28 |
| | | | | 361/329 |
| 2014/0286064 A1* | 9/2014 | Kamizuma | .............. | H01G 2/08 |
| | | | | 361/301.5 |
| 2015/0334875 A1 | 11/2015 | Topolewski et al. | | |
| 2021/0110978 A1 | 4/2021 | Smit et al. | | |
| 2022/0142014 A1* | 5/2022 | Ono | ......................... | H05K 5/04 |
| | | | | 361/699 |

FOREIGN PATENT DOCUMENTS

| JP | 2014-090562 A | 5/2014 |
|---|---|---|
| JP | 2017-220504 A | 12/2017 |

\* cited by examiner

DC LINK CAPACITOR, POWER CONVERTER AND ELECTRIC VEHICLE

TECHNICAL FIELD

The invention relates to a DC link capacitor, a power converter and an electric vehicle.

BACKGROUND ART

Power converters, in particular inverters comprise DC link capacitators intended to smooth a DC voltage provided by a DC voltage source, for instance, a battery.

Conventional DC link capacitors, as disclosed, for instance, by published US American application for patent No. 2021/0110978 comprise a plurality of capacitor cells, a capacitor housing the capacitor cells and bus bars directly connected to wound metallized plastic films of the capacitor cells in order to connect the capacitor cells in parallel.

US-American application for patent No. 2015/334875 discloses an inverter for a vehicle. The inverter comprises a coldplate which includes a first coldplate member and a second cold plate member. The first coldplate member includes a pocket configured to receive a DC link capacitor of the inverter therein. The pocket is sized to surround the DC link capacitor when the DC link capacitor is received within the pocket to thereby provide physical integration of the DC link capacitor in the coldplate member. The cold plate are made from metal and the DC link capacitor comprises a plurality of film capacitors. The DC link capacitor is "naked", i.e. is not encapsulated, for instance, potted, within its own casing and the pocket of the first cold plate member is filled with a potting material which substantially surrounds the film capacitors.

DISCLOSURE OF INVENTION

An object of the invention is to provide a more flexible DC link capacitor. In particular, the DC link capacitor may be manufactured relatively easily and/or may be flexible with regards to the arrangement of an electrical connection of the capacitor cells of a DC link capacitor.

The object of the invention is solved by means of a DC link capacitor, comprising a capacitor housing, a plurality of capacitor cells, each comprising a film capacitor element with a wound metallized film and two contact terminals connected to the metallized plastic film, the plurality of capacitor cells being arranged in the capacitor housing and sealed therein by means of a sealing material, the contact terminals being electrically isolated from each other and protruding separately out of the sealing material, in order to be connected by means of a bus bars. In particular, the wound metallized film is a wound metalized plastic film or comprises a metal foil separated by an insulation film.

Another aspect of the invention is directed to a power converter, comprising the inventive DC link capacitor, and a power section comprised of a plurality of controllable switches connected to the DC link capacitor. The power section is preferably connected to the DC link capacitor by means of the bus bars.

The power converter may be an inverter, whose power section is configured to convert a DC voltage present at the DC link capacitor to an AC voltage. The AC voltage may be a multiphase voltage, for instance a three-phase voltage, and is particularly intended to power an electric motor.

Another aspect of the invention is directed to an electric vehicle, comprising the inverter, a DC voltage source, for instance a battery, connected to the DC link capacitor and an electric motor connected to the power section, the DC link capacitor being configured to smooth a DC voltage obtained from the DC voltage source, the power section being configured to generate an AC voltage from the DC voltage smoothed by the DC link capacitor for driving the electric motor, and the electric motor being mechanically coupled to wheels of the electric vehicle.

The inventive DC link capacitor, thus, comprises the capacitor housing all the individual capacitor cells. The capacitor housing is filled with the sealing material, for instance, a potting or a resin, particularly fixating the capacitor cells to the capacitor housing.

Each capacitor cell comprises contact terminal, which protrude separately out of the sealing material and are electrically isolated from each other, meaning that they are not connected directly electrically. In particular, the wound metallized films are covered totally by the sealing material.

The contact terminal of the capacitor cells are intended to be connected by means of the bus bars, in order to connect the individual capacitor cells in parallel.

An aspect of the invention, therefore, is directed to a DC link capacitor arrangement, comprising the DC link capacitor and bus bars connected to the individual capacitor cells in order to connect the individual capacitor cells in parallel.

In particular, the individual capacitor cells are essentially identical, potentially reducing the cost of the DC link capacitor.

Beneficially, the film capacitor elements can have the shape of a general cylinder. In particular, the capacitor element can have a bottom base and a top base whose surfaces are oval, and a cylindrical surface. This shape is preferred because it allows for DC link capacitors with a relatively high density factor, meaning that the share of the volume of the capacitor cells on the total volume of a DC link capacitor is comparably high. Other shapes may also be contemplated.

Advantageously, the two contact terminals of the capacitor cells can be flat and rigid. In this way, the capacitor cells can be connected relatively easily to the bus bars, and, moreover, heat dissipation from the capacitor cells may be supported.

The capacitor housing may comprise compartments, each capacitor cell being arranged in one of the compartments. Since each capacitor cell is arranged in a compartment of the capacitor housing, the individual capacitor cells can be aligned with respect to the capacitor housing, such that the contact terminal are positioned and orientated with respect to the capacitor housing in a predefined manner. This may result in an improved connection of the bus bars to the contact terminal.

The compartments may be interconnected, such that the sealing material forms a bridge connecting the compartments, potentially resulting in an improved sealing of the individual capacitor cells by means of the sealing material. The compartments may comprise separating walls within the capacitor housing which may be lower than the outer walls of the capacitor housing.

The capacitor housing may comprise guides to align the capacitor cells with the capacitor housing into a predefined position relative to the capacitor housing, in particular to fixate the capacitor cells into a predefined position and in particular orientation relative to the capacitor housing. This may result in an improved connection of the bus bars to the contact terminal.

At least one of the guides may also interact with the contact terminals of a capacitor cell.

The sealing material may be humidity-tight. In this way, the capacitor cells can be protected against unfavorable environmental conditions.

The sealing material may be elastic. In this way, the capacitor cells can be protected against cracking and delamination due to different thermal expansion coefficients of the components used.

The contact terminals may each comprise a recess in the region which protrudes out of the sealing material, e.g. a circular hole. In this way, the capacitor cells can be aligned in the common housing during the sealing. A suitable tool may be inserted through the recesses during applying the sealing material, which tool is detached later after the sealing material has solidified. Then, the capacitor cells can be aligned with the capacitor housing without the need of compartments and/or guides in the common housing by these measures.

The capacitor housing may comprise at least one mounting flange or mounting clip. In this way, the DC link capacitor can be mounted to the power converter. The mounting flange may have holes to screw the DC link capacitor to the power converter.

In particular, the power converter may comprise a converter housing, wherein the DC link capacitor is directly attached to the converter housing, potentially improving cooling the DC link capacitor. In particular, the converter housing is made from metal.

According to an embodiment of the inventive power converter, the converter housing made from metal comprises a recess, for instance, an indention or a pocket, which forms the capacitor housing. Consequently, the capacitor element may be arranged directly in the recess of the converter housing and is sealed therein by means of the sealing material, potentially improving cooling of the capacitor element. The contact terminals are electrically isolated from each other and protrude separately out of the sealing material, in order to be connected by means of the bus bars.

It should be noted that the various embodiments and the advantages resulting thereof which have been presented for the proposed DC link capacitor and the proposed power converter are interchangeable as the case may be. That means, that an embodiment or advantage, which has been presented for the proposed DC link capacitor, may equally apply to the power converter and so on.

BRIEF DESCRIPTION OF DRAWINGS

The invention now is described in more detail hereinafter with reference to particular embodiments, which the invention however is not limited to.

DETAILED DESCRIPTION

Generally, same parts or similar parts are denoted with the same/similar names and reference signs. The features disclosed in the description apply to parts with the same/similar names respectively reference signs. Indicating the orientation and relative position is related to the associated figure, and indication of the orientation and/or relative position has to be amended in different figures accordingly as the case may be.

Figure 1:
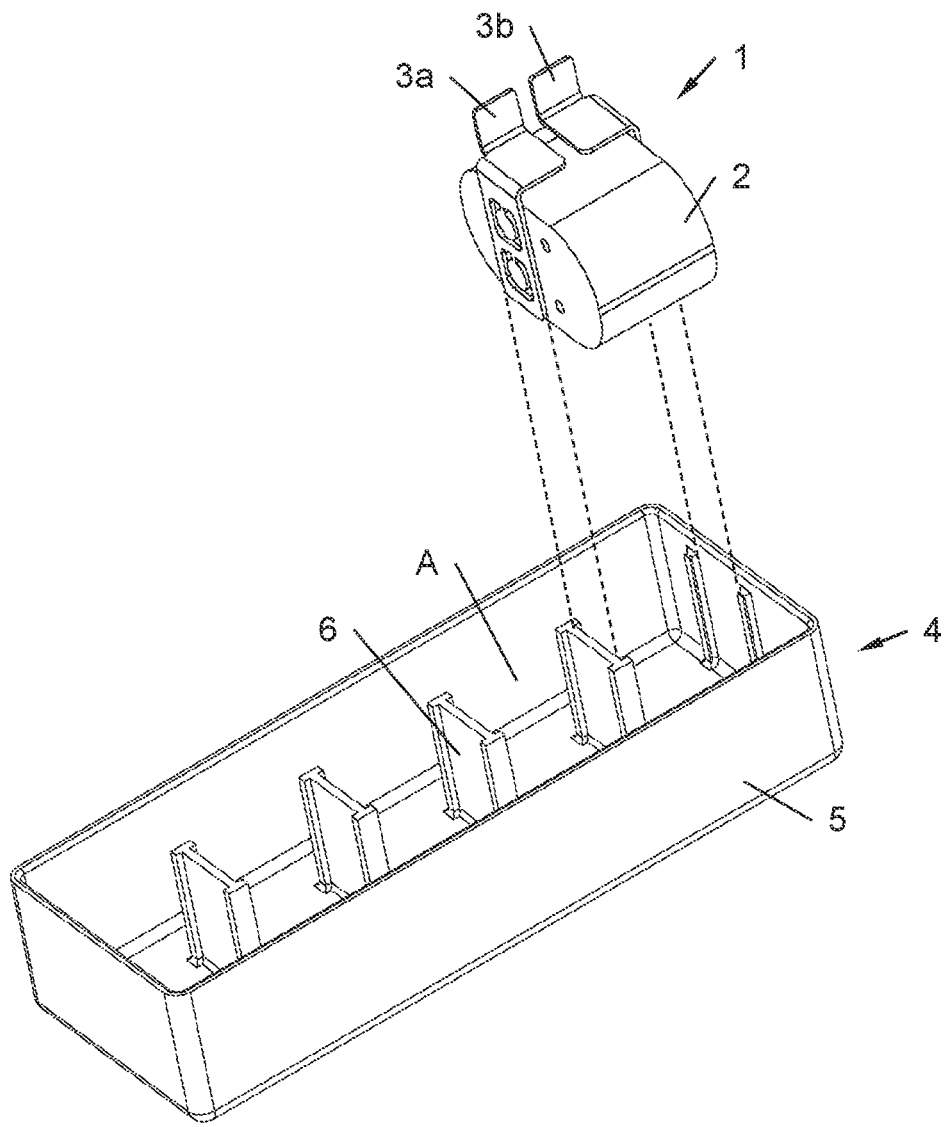
FIG. 1 shows an exploded view of a capacitor cell and a capacitor housing of a DC link capacitor.
Figure 2:
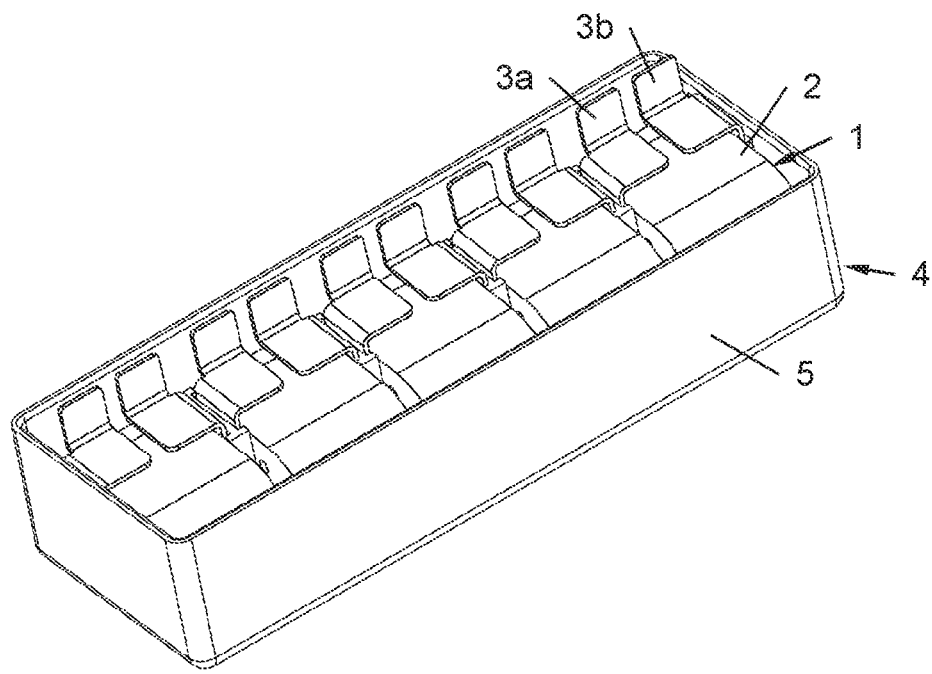
FIG. 2 shows the capacitor housing of FIG. 1, in which a plurality of capacitor cells is inserted.
Figure 3:
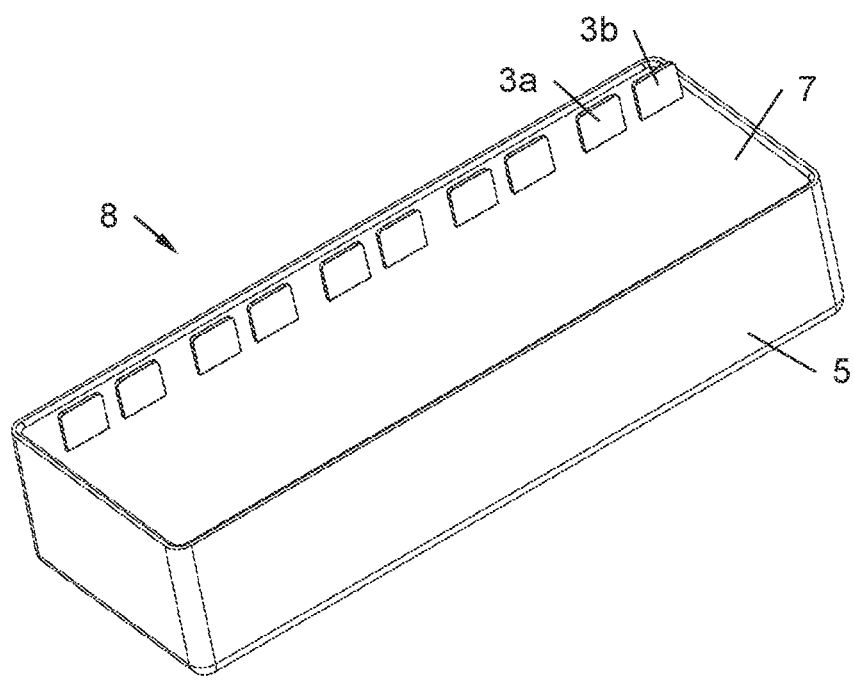
FIG. 3 shows the DC link capacitor with the capacitor cells sealed in the capacitor housing.

FIGS. 1 to 3 show steps in the manufacturing process of a DC link capacitor 8.

In detail, FIG. 1 shows a capacitor cell 1 which comprises a film capacitor element 2 with a wound metallized film and two contact terminals 3a, 3b connected to the metallized plastic film. The capacitor cell 1 is ready to be inserted into a capacitor housing 4 of the DC link capacitor 8 in exploded view. In particular, In particular, the wound metallized film is a wound metalized plastic film or comprises a metal foil separated by an insulation film.

The contact terminals 3a, 3b are connected to the metallized film which forms the capacitance of the capacitor cell 1, by means of tin shooping areas. A shooping area basically is a metallization and enables soldering the contact terminals 3a, 3b to the metallized plastic film.

In this example, the contact terminals 3a, 3b are flat and rigid. In this way, the capacitor cells 1 can be connected relatively easily by means of bus bars not shown in the figures.

In this example, the film capacitor element 2 of the capacitor cell 1 has a cylindric shape, in more detail the shape of a general cylinder. Concretely, the capacitor element 2 has an oval bottom surface and an oval top surface. This shape is preferred because it allows for DC link capacitors 8 with a high density factor, meaning that the share of the volume of the capacitor cells 1 on the total volume of a DC link capacitor 8 is comparably high. In the embodiment shown in FIG. 1, the oval bottom and top surfaces are orientated vertically.

The capacitor housing 4 comprises outer walls 5 and may comprise guides 6 as shown in FIG. 1 so as to assist inserting the capacitor cell 1 into the capacitor housing 4 and to assist aligning the capacitor cell 1 within the capacitor housing 4. In this example, the guides 6 interact with the contact terminals 3a, 3b of the capacitor cells 1. For aligning the capacitor cell 1, however, a guide 6 can also be made slightly larger than the (complete) capacitor cell 1. Basically, the guides 6 in FIG. 1 form interconnected compartments A. In this way, sealing is eased because a sealing material 7, for instance a potting material or a resin, can flow from compartment A to compartment A. Compartments A, however, may also be formed by (continuous) separating walls within the capacitor housing 4. To allow the sealing material 7 flow from one of the compartments A to another of the compartments A, the separating walls can be made lower than the outer walls 5 of the capacitor housing 4.

FIG. 2 shows the capacitor housing 4 of FIG. 1, in which a plurality of capacitor cells 1 is inserted. The capacitor cells 1 are each arranged in a compartment A of the capacitor housing 4 and are each held in position by means of guides 6. As is it visible in FIG. 2, the contact terminals 3a, 3b of all capacitor cells 1 are electrically isolated from each other, and the individual capacitor cells 1 are essentially identical.

FIG. 3 finally shows the DC link capacitor 8 with the capacitor cells 1 sealed in the capacitor housing 4. As is it visible in FIG. 3, the contact terminals 3a, 3b separately protrude out of the sealing material 7. The sealing material 7, which in particular is a resin, forms a bridge connecting the compartments A in this example.

It should be noted that although the sealing material 7 can flow from compartment A to compartment A, it is not necessarily filled in in just one of the compartments A.

Instead, the sealing material 7 may be filled in in some or all of the compartments A, wherein eventual inequalities are leveled out.

The sealing material 7 in particular can be humidity-tight to protect the capacitor cells 1 (in particular its metallized film and tin shooping area) from unfavorable environmental conditions and/or can be elastic to protect the capacitor cells 1 from cracking and delamination due to different thermal expansion coefficients of the components used.

In the above example, alignment of the capacitor cells 1 is done by the compartments A and/or the guides 6. This is advantageous but not the only solution. Alternatively or in addition, the contact terminals 3a, 3b each can comprise a recess in the region protruding out of the sealing material 7, e.g. a circular hole. For aligning the capacitor cells 1 during potting, a suitable tool (here a rake-like tool) is inserted through the recesses during sealing and detached again after solidification of the sealing material 7. In this way, the capacitor cells 1 can be aligned without the need of compartments A and/or guides 6 in the capacitor housing 4.

It should be noted that the proposed DC link capacitor 8 is not linked to the particular shape of the capacitor cells 1 and the capacitor housing 4 shown in FIGS. 1 to 3. Instead, one skilled in the art will easily understand that other embodiments can form a DC link capacitor 8 in a similar way.

Figure 4:
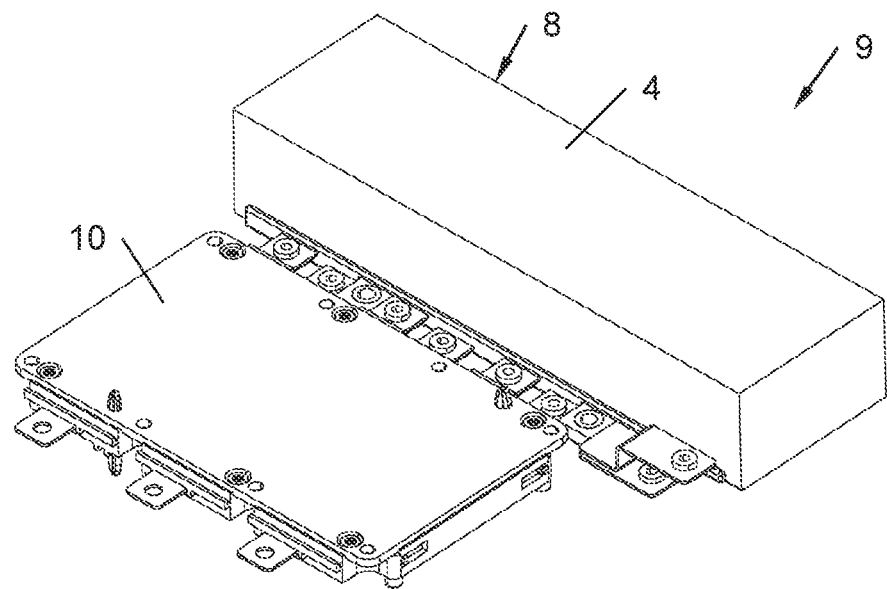
FIG. 4 shows an example of a power converter seen from above.

FIG. 4 shows an example of a power converter, in particular an inverter 9. The inverter 9 comprises the DC link capacitor 8, and a power section 10, for instance, a power module connected to the DC link capacitor 8. The DC link capacitor 8 is configured to smooth a DC voltage obtained from a DC voltage source, for instance a battery, and the power section 10 is configured to generate an AC voltage from the DC voltage smoothed by the DC link capacitor 8. The power section 10 comprises of a plurality of controllable switches, which can be embodied as semiconductor switches, for instance, MOSFETs, IGBTs, etc. In addition, the inverter 9 of FIG. 4 may comprise an inverter housing not shown in the figures. The DC link capacitor 8 can be directly attached to the inverter housing.

In FIG. 4, the electrical connection of the capacitor cells 1 is not visible in detail. Generally the electric connection of the individual capacitor cells 1 can be done by means of bus bars, i.e. by directly connecting the contact terminals 3a, 3b by, for instance, welding or soldering the bus bars to the contact terminal 3a, 3b in order to connect the capacitor cells 1 in parallel.

In one embodiment, the capacitor housing 4 can comprise at least one mounting flange, for instance, comprising holes to screw the DC link capacitor 8 in place, or at least one mounting clip. In this way, the DC link capacitor 8 can be mounted to a frame or the inverter housing.

Figure 5:
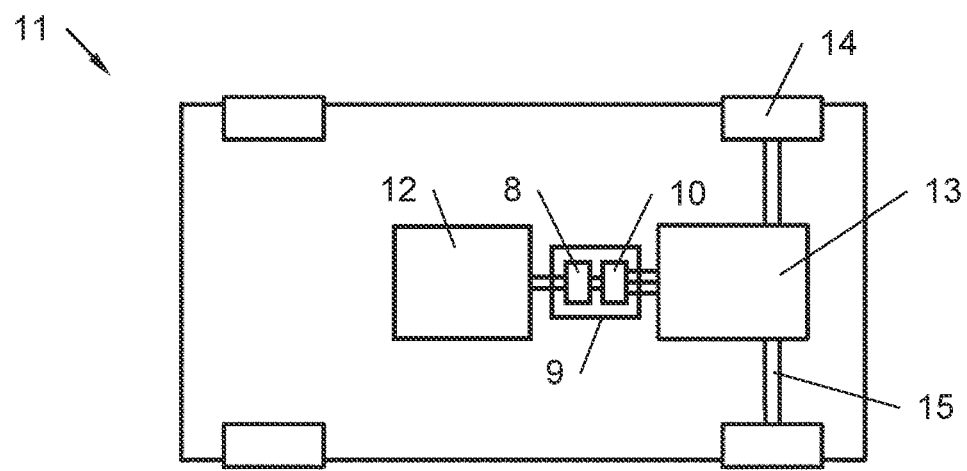
FIG. 5 shows a schematic view of an electric vehicle.

FIG. 5 finally shows an electric vehicle 11, which comprises the inverter 9 as outlined above, a DC voltage source 12, for instance, a battery or a fuel cell connected to the DC link capacitor 8 and an electric motor 13 connected to the power section 10 of the inverter 9. The electric motor 13 is mechanically coupled to wheels 14 of the electric vehicle 11 by means of axles 15. Generally, the DC link capacitor 8 is configured to smooth a DC voltage obtained from the DC voltage source 12, and the power section 10 is configured to generate an AC voltage from the DC voltage smoothed by the DC link capacitor 8 so as to power the electric motor 13.

The invention claimed is:

1. A DC link capacitor, comprising:
    a capacitor housing; and
    a plurality of capacitor cells arranged in the capacitor housing and sealed therein by a sealing material,
    wherein the capacitor housing only houses the plurality of capacitor cells,
    wherein each one of the plurality of capacitor cells comprises:
        a film capacitor element with a wound metallized film, and
        two contact terminals directly connected on one side of the wound metallized film,
    wherein the two contact terminals are:
        electrically isolated from each other,
        protruded separately out of the sealing material, and
        connected by bus bars.

2. The DC link capacitor as claimed in claim 1, wherein the contact terminals are flat and rigid, and/or the wound metallized film is a wound metalized plastic film or comprises a metal foil separated by an insulation film.

3. The DC link capacitor as claimed in claim 1, wherein the capacitor housing comprises compartments, each capacitor cell being arranged in one of the compartments.

4. The DC link capacitor as claimed in claim 3, wherein the compartments are interconnected, and the sealing material forms a bridge connecting the compartments.

5. The DC link capacitor as claimed in claim 1, wherein the capacitor housing comprises guides to align the capacitor cells with the capacitor housing into a predefined position relative to the capacitor housing to fixate the capacitor cells into a predefined position relative to the capacitor housing.

6. The DC link capacitor as claimed in claim 1, wherein the sealing material is humidity tight.

7. The DC link capacitor as claimed in claim 1, wherein the contact terminals each comprise a recess in a region protruding out of the sealing material.

8. The DC link capacitor as claimed in claim 1, wherein the capacitor housing comprises at least one mounting flange or mounting clip.

9. A power converter comprising a DC link capacitor as claimed in claim 1 and a power section comprised of a plurality of controllable switches connected to the DC link capacitor.

10. The power converter of claim 9, comprising a converter housing made from metal which includes a recess forming the capacitor housing.

11. An electric vehicle, comprising:
    an inverter according to claim 9; and
    a DC voltage source connected to the DC link capacitor and an electric motor connected to the power section,
    the DC link capacitor being configured to smooth a DC voltage obtained from the DC voltage source, the power section being configured to generate an AC voltage from the DC voltage smoothed by the DC link capacitor for driving the electric motor, and the electric motor being mechanically coupled to wheels of the electric vehicle.

* * * * *